US011515553B2

(12) United States Patent
Goshtasbi et al.

(10) Patent No.: US 11,515,553 B2
(45) Date of Patent: Nov. 29, 2022

(54) DEGRADATION-CONSCIOUS CONTROL FOR PEM FUEL CELLS

(71) Applicant: THE REGENTS OF THE UNIVERSITY OF MICHIGAN, Ann Arbor, MI (US)

(72) Inventors: Alireza Goshtasbi, Ann Arbor, MI (US); Tulga Ersal, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 181 days.

(21) Appl. No.: 16/839,282

(22) Filed: Apr. 3, 2020

(65) Prior Publication Data

US 2020/0321641 A1    Oct. 8, 2020

Related U.S. Application Data

(60) Provisional application No. 62/828,533, filed on Apr. 3, 2019.

(51) Int. Cl.
*H01M 8/1004* (2016.01)
*H01M 8/04298* (2016.01)
*H01M 8/04291* (2016.01)
*H01M 8/04119* (2016.01)
(Continued)

(52) U.S. Cl.
CPC ....... *H01M 8/1004* (2013.01); *H01M 8/0485* (2013.01); *H01M 8/04134* (2013.01);
(Continued)

(58) Field of Classification Search
CPC .............. H01M 8/04305; H01M 8/04992
See application file for complete search history.

(56) References Cited

U.S. PATENT DOCUMENTS

2008/0154558 A1* 6/2008 Zhou ................ H01M 8/04305
                                                       703/2

FOREIGN PATENT DOCUMENTS

CN        109921072     *   6/2019

OTHER PUBLICATIONS

Puranik, Sachin et al., "State-Space Modeling of Proton Exchange Membrane Fuel Cell," IEEE Transactions on Energy Conversion 25 (3), Sep. 2010, 804-813.*

(Continued)

*Primary Examiner* — Jonathan Crepeau
(74) *Attorney, Agent, or Firm* — Harness, Dickey & Pierce, P.L.C.

(57) ABSTRACT

A linear time varying model predictive control (LTV-MPC) framework is developed for degradation-conscious control of automotive polymer electrolyte membrane (PEM) fuel cell systems. A reduced-order nonlinear model of the entire system is derived first. This nonlinear model is then successively linearized about the current operating point to obtain a linear model. The linear model is utilized to formulate the control problem using a rate-based MPC formulation. The controller objective is to ensure offset-free tracking of the power demand, while maximizing the overall system efficiency and enhancing its durability. To this end, the fuel consumption and the power loss due to auxiliary equipment are minimized. Moreover, the internal states of the fuel cell stack are constrained to avoid harmful conditions that are known stressors of the fuel cell components.

23 Claims, 7 Drawing Sheets

(51) Int. Cl.
*H01M 8/04537* (2016.01)
*H01M 8/04701* (2016.01)
*H01M 8/04746* (2016.01)
*H01M 8/04828* (2016.01)
*H01M 8/04858* (2016.01)
*H01M 8/04992* (2016.01)

(52) U.S. Cl.
CPC ... *H01M 8/04291* (2013.01); *H01M 8/04305* (2013.01); *H01M 8/04604* (2013.01); *H01M 8/04723* (2013.01); *H01M 8/04753* (2013.01); *H01M 8/04768* (2013.01); *H01M 8/04835* (2013.01); *H01M 8/04895* (2013.01); *H01M 8/04925* (2013.01); *H01M 8/04992* (2013.01)

(56) References Cited

OTHER PUBLICATIONS

Goshtasbi, Alireza et al., "A Real-Time Pseudo-2D Bi-Domain Model Of PEM Fuel Cells For Automotive Applications", Proceedings of the ASME 2017 Dynamic Systems and Control Conference, DSCC2017-5053, Oct. 11-13, 2017.

Goshtasbi, Alireza et al., "Computationally Efficient Psuedo-2D Non-Isothermal Modeling Of Polymer Electrolyte Membrane Fuel Cells With Two-Phase Phenomena", Journal of the Electrochemical Society, 163(13) F1412-F1432, published Oct. 6, 2016.

\* cited by examiner

DEGRADATION-CONSCIOUS CONTROL FOR PEM FUEL CELLS

CROSS-REFERENCE TO RELATED APPLICATIONS

This application claims the benefit of U.S. Provisional Application No. 62/828,533, filed on Apr. 3, 2019. The entire disclosure of the above application is incorporated herein by reference.

FIELD

The present disclosure relates to degradation-conscious control for fuel cells.

BACKGROUND

State-of-the-art polymer electrolyte membrane (PEM) fuel cell stacks mostly meet the performance targets for the automotive industry. Nevertheless, cost reduction and durability enhancement remain two of the major roadblocks to their widespread use. Among the various stack components, the catalyst layers and membrane are particularly prone to degradation, thereby limiting the stack's useful lifetime. Specifically, chemical and mechanical stressors can result in membrane pinhole and crack formation, catalyst delamination, platinum dissolution, and catalyst support corrosion. While effects of operating conditions on degradation rates have been investigated in both the modeling and experimental literature, quantitative bounds on the internal states and effective control strategies that ensure operation within those bounds have remained elusive.

This disclosure documents the first steps towards addressing the latter challenge. In particular, assuming that quantitative bounds on the internal states will become available through extensive ongoing research in this area, one can aim to formulate a control strategy that respects those bounds while trying to meet the power requested by the higher level controller.

The challenge in the control design lies in the fact that the degradation constraints will be on the states internal to each cell. For instance, such constraints can take the form of bounds on the membrane hydration or its rate of change. However, the control inputs only affect the channel conditions directly, while having an indirect effect on the internal states through the boundary conditions. Therefore, the control problem in this case is essentially that of a partial differential equation (PDE) boundary control. Nevertheless, with proper model formulation and discretization, this problem can be posed as a typical ordinary differential equation (ODE) control problem. Model predictive control (MPC) is especially suited for this application, since it provides a flexible and rigorous way of handling various constraints on the states and inputs.

This disclosure develops a linear time varying MPC (LTV-MPC) framework for degradation-conscious control of PEM fuel cells with special attention to improving the membrane durability. In doing so, the specific focus is on using high-fidelity models, flexibility in the resulting framework, and real-time computation capabilities. LTV-MPC enables us to strike a balance between these often conflicting requirements. More specifically, the ability to efficiently solve the resulting quadratic program allows for use of high-fidelity models along with a variety of constraints that may inhibit real-time control law generation if nonlinear MPC were to be used.

This section provides background information related to the present disclosure which is not necessarily prior art.

SUMMARY

This section provides a general summary of the disclosure, and is not a comprehensive disclosure of its full scope or all of its features.

A method is presented for controlling a fuel cell having a polymer electrolyte membrane. A reduced-order model is generated for heat and water transport across the fuel cell, where the water content in the membrane is modeled using only ordinary differential equations and temperature of the membrane is modeled using only ordinary differential equations. The reduced-order model is linearized at each time step about a current operating condition of the fuel cell to form a linear model and a state-space representation of a control problem is formulated for tracking power output by the fuel cell from the linear model. The method further includes: receiving a desired power demand for the fuel cell; receiving a measurement of power output by the fuel cell; and determining the operating conditions of the fuel cell by solving the control problem using the desired power demand and the power measurement for the fuel cell.

In another aspect, the technique accounts for simplified models of the auxiliary components of the fuel cell system, thereby allowing for more accurate description of their power consumption. In one example, the fuel system includes an air compressor and a cooling subsystem, where the air compressor delivers oxygen to cathode of the fuel stack. In this example, the reduced-order model for the fuel cell system is generated, such that the reduced-order model models operating parameters for an air compressor and cooling subsystem of the fuel cell system. Again, the reduced-order model is linearized at each time step about a current operating condition of the fuel cell system to form a linear model and a state-space representation of a control problem is formulated for tracking power output by the fuel cell system from the linear model. The method further includes: receiving a desired power demand for the fuel cell system; receiving a measurement of power output by the fuel cell system; and determining the operating conditions of the fuel cell system by solving the control problem using the desired power demand and the power measurement for the fuel cell system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
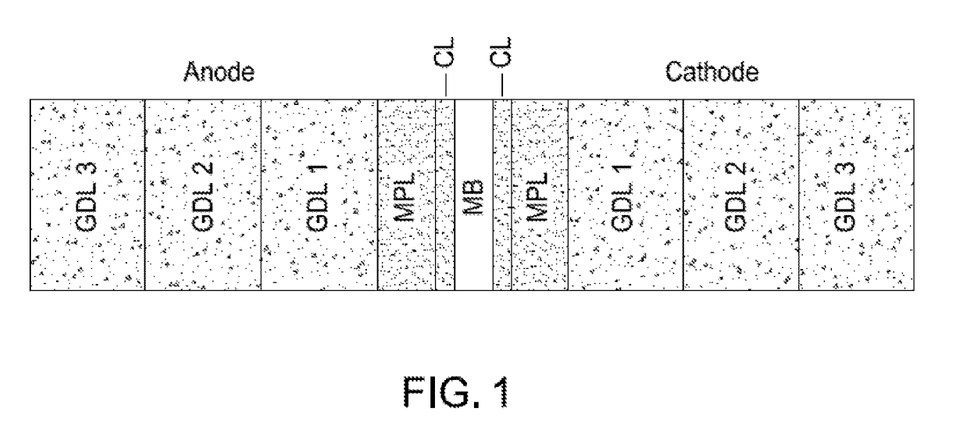
FIG. 1 is a diagram of a modeling domain and through-the-membrane discretization.

The modeling domain used in this disclosure is illustrated in FIG. 1. The plant model is obtained by writing the PDEs governing mass and heat transport across the cell's thickness. In particular, in the example embodiment, the following diffusion equations are used to model transport in the cell:

$$\varepsilon_g \frac{\partial c_v}{\partial t} = \nabla \cdot \left( D_{H_2O}^{eff} \nabla c_v \right) + S_v, \qquad (1)$$

$$\rho_l \varepsilon \frac{\partial s}{\partial t} = \nabla \cdot \left( \frac{\rho_l K_l^{eff}}{\mu_l} \nabla p_l \right) + S_l, \qquad (2)$$

$$\sum_\alpha \varepsilon_\alpha \rho_\alpha c_{p,\alpha} \frac{\partial T}{\partial t} = \nabla \cdot (k_T \nabla T) + S_T, \qquad (3)$$

$$\varepsilon_{ion} \frac{\rho_{ion}}{EW} \frac{\partial \lambda}{\partial t} = \nabla \cdot (N_{w,mb}) + S_\lambda. \qquad (4)$$

Description of the parameters along with their numerical values and details of computing the various source terms and material properties can be found in applicant's earlier modeling works by A. Goshtasbi et al in "A mathematical model toward real-time monitoring of automotive PEM fuel cells", Journal of the Electrochemical Society (2020) which are incorporated by reference in their entirety. A general overview of the equations is provided. Equation (1) describes water vapor transport in the porous media via diffusion. Convection is neglected, since it has been shown to have a negligible effect on mass transport in fuel cells. Equation (2) is used to track liquid water accumulation in the porous media, whereas Equation (3) models the conductive heat transfer through the cell layers while accounting for various sources of heat generation. Equation (4) is used to model water transport in the ionomer phase through the membrane thickness and the catalyst layers (CL). Water transport across the membrane includes the effects of electro-osmotic drag, diffusion, thermos-osmosis, and hydraulic permeation. In addition to the transport PDEs (1)-(4), two states are used to model the stress relaxation in the ionomer phase through the membrane thickness and the catalyst layers (CL). Water transport across the membrane includes the effects of electro-osmotic drag, diffusion, thermos-osmosis, and hydraulic permeation. In addition to the transport PDEs (1)-(4), two states are used to model the ionomer relaxation phenomena. A first order dynamical equation with a state-dependent time constant is used for this purpose:

$$\frac{ds_{mb}^{an/ca}}{dt} = -\frac{1}{\tau(\lambda)} \left( s_{mb}^{an/ca} - 0.25 \lambda_{eq}^{an/ca} \right) \qquad (5)$$

The transport PDEs (1)-(4) are discretized using the finite volume method. With reference to FIG. 1, the cell thickness is divided into 11 control volumes; 5 on each side of the membrane (i.e., 3 for the gas diffusion layer (GDL), 1 for the microporous layer (MPL), and 1 for the CL) and 1 control volume for the membrane (FIG. 1). The discretized system of equations results in a state space model with 36 states describing the temperature distribution (11 states), water vapor concentration (10 states), liquid pressure (10 states), and the ionomer hydration (3 states) and relaxation (2 states).

In one embodiment, where the compressor is not explicitly modeled, there are 5 inputs to the model that include the current density ($u_1 = i_{dens}$), coolant/channel temperature ($u_2 = T_{ch}$), anode and cathode channel relative humidities ($u_3 = RH_{an}$, $u_4 = RH_{ca}$), and channel pressure ($u_5 = p_{ch}$). These inputs along with the state equations can be used to calculate the cell voltage ($V_{cell}$) The details of cell voltage calculations are described by A. Goshtasbi et al in "A mathematical model toward real-time monitoring of automotive PEM fuel cells", Journal of the Electrochemical Society (2020). The system output is the resulting power density. In an example embodiment, this power density is calculated as follows:

$$P_{net} = P_{cell} - P_{aux} \qquad (6)$$
$$= V_{cell} \, i_{dens} - (0.02 + 0.01 \, i_{dens} + 0.03 \, p_{ch})$$

where $P_{cell}$ and $P_{aux}$ denote the generated power density by the fuel cell and the consumed power density by the auxiliary equipment i.e., compressor, humidifier, and cooling system), respectively. Models of the auxiliary components are not included in this example embodiment and it is assumed that their power consumption can be expressed as a linear function of pressure and current density. The dependence on pressure is based on the compressor power loss, while that on the current density is due to higher flow rates needed to maintain safe stoichiometric ratios and cool the stack.

The full-order model described above is used as a plant model to obtain information about the internal states of the fuel cell. In an example embodiment, this plant model may be used in open-loop mode to provide estimates of the fuel cell states. Other embodiments may utilize the model in a closed-loop observer to increase the robustness of the estimates to possible modeling errors. In either case, such a large-scale model is not amenable to computations required to generate the MPC control law. As such, a reduced model is developed for MPC design purposes. In creating the reduced-order model, two important observations are made. First, note that the states that are critical to degradation are mostly related to the catalyst coated membrane (CCM), while the GDL and MPL states are intermediate ones between the controlled channel conditions and the CCM states. Second, many of these intermediate states can be lumped into effective transport properties that do not vary significantly over the span of a few seconds.

Keeping the above points in mind, the focus is on capturing the membrane temperature and hydration state. The water vapor concentrations in the CLs are needed to obtain an accurate estimation of the membrane hydration state. Therefore, they are also included in the reduced model. Finally, liquid saturation in the CLs was found to be critically important. This is due to the fact that the CLs have small pores and can get flooded very quickly, on the order of a few seconds. If the MPC model is not aware of such behavior it may generate control inputs that result in a flooded CL, from which it may not be able to recover the required performance. Therefore, two states for liquid saturation in the CLs are included in the reduced model. In short, the reduced model for the MPC focuses on CCM states rather than capturing the distributions through the cell. In doing so, the reduced model relies on updated parameters that relate the CCM states to the channel conditions. These parameters are obtained from the full-order plant model by lumping the transport resistances. Furthermore, they are updated every few time steps to maintain the accuracy of the reduced model.

It is also important to note that the MPC has to avoid reactant starvation in the catalyst layers. Many works in the fuel cell MPC literature impose a nonzero reactant concentration constraint in the CLs. This would require additional states for these variables to be added to the MPC model, making it of higher complexity. However, such constraints can be posed in other formats, for instance as cell voltage constraints. This latter approach is adopted in this disclosure.

The resulting reduced model equations for this example embodiment are as follows:

$$\varepsilon_{ion}^{an} \frac{\rho_{ion}}{EW} \frac{d\lambda_{CL}^{an}}{dt} = \frac{1}{\delta_{CL}^{an}}(-N_{w,mb}^{an} + 2N_{O_2,mb}) + S_{ad}^{an}, \quad (7)$$

$$\varepsilon_{ion}^{ca} \frac{\rho_{ion}}{EW} \frac{d\lambda_{CL}^{ca}}{dt} = \frac{1}{\delta_{CL}^{ca}}\left(N_{w,mb}^{ca} + \frac{i_{dens}}{2F} + N_{H_2,mb}\right) + S_{ad}^{cn}, \quad (8)$$

$$\varepsilon_{ion}^{mb} \frac{\rho_{ion}}{EW} \frac{d\lambda_{mb}}{dt} = -\frac{1}{\delta_{mb}}(N_{w,mb}^{ca} - N_{w,mb}^{an}) \quad (9)$$

$$\frac{dT_{mb}}{dt} = \frac{1}{(\rho c_p)_{mb}} \left( \frac{T_{mb} - T_{CH,avg}}{\delta^{ca} \mathcal{R}_T^{ca}} + \frac{T_{mb} - T_{CH,avg}}{\delta^{an} \mathcal{R}_T^{an}} \right) + \quad (10)$$

$$\frac{S_{T,mb}}{(\rho c_p)_{mb}} + \frac{S_{T,CL}^{ca}}{(\rho c_p)_{CL}} + \frac{S_{T,CL}^{an}}{(\rho c_p)_{CL}},$$

$$\varepsilon_{g,CL}^{an} \frac{dc_{v,CL}^{an}}{dt} = \frac{1}{\delta_{CL}^{an}}\left(-\frac{c_{v,CL}^{an} - c_{v,CH}^{an}}{\mathcal{R}_v^{an}}\right) + S_{pc}^{an} - S_{ad}^{an}, \quad (11)$$

$$\varepsilon_{g,CL}^{ca} \frac{dc_{v,CL}^{ca}}{dt} = \frac{1}{\delta_{CL}^{ca}}\left(-\frac{c_{v,CL}^{ca} - c_{v,CH}^{ca}}{\mathcal{R}_v^{ca}}\right) + S_{pc}^{ca} - S_{ad}^{ca}, \quad (12)$$

$$\rho_l \varepsilon_{CL}^{an} \frac{ds_{CL}^{an}}{dt} = \frac{\rho_l K_l^{eff}(p_{1,MPL}^{an} - p_{1,CL}^{an})}{0.5\mu_l(\delta_{CL}^{an} + \delta_{MPL}^{an})\delta_{CL}^{an}} - M_{H_2O}S_{pc}^{an}, \quad (13)$$

$$\rho_l \varepsilon_{CL}^{ca} \frac{ds_{CL}^{ca}}{dt} = \frac{\rho_l K_l^{eff}(p_{1,MPL}^{ca} - p_{1,CL}^{ca})}{0.5\mu_l(\delta_{CL}^{ca} + \delta_{MPL}^{ca})\delta_{CL}^{ca}} - M_{H_2O}S_{pc}^{ca}, \quad (14)$$

Once again, the description of different parameters and variables are described by A. Goshtasbi et al in "A mathematical model toward real-time monitoring of automotive PEM fuel cells", Journal of the Electrochemical Society (2020) and only a general overview is provided here for brevity. Particularly, the reduced model has eight states. Equations (7)-(9) describe the ionomer water content in the CCM, while (10) governs the membrane temperature. Equations (11)-(14) are used to model the vapor concentration and liquid saturation dynamics in the catalyst layers. The inputs and outputs are identical to those of the full-order model.

The reduced model can be written in the following condensed format:

$$\dot{x}=f(x,u,\wedge)$$

$$y=g(x,u,\wedge)$$

$$z=h(x,u,\wedge) \quad (15)$$

where $x \in \mathbb{R}^{8 \times 1}$ denotes the vector of states, $u \in \mathbb{R}^{5 \times 1}$ is the vector of inputs, $y \in \mathbb{R}$ is the cell voltage. The last equation is only used to impose constraints on the cell voltage. $\Lambda \in \mathbb{R}^{10 \times 1}$ is the vector containing the varying parameters ($s_{mb}^{an}, s_{mb}^{ca}$), diffusion resistances to vapor transport ($\mathcal{R}_v^{an}$, $\mathcal{R}_v^{ca}$), diffusion resistances to reactant transport ($\mathcal{R}_r^{an}$, $\mathcal{R}_r^{ca}$), and capillary pressure in the anode and cathode MPLs ($p_{1,MPL}^{an}, p_{1,MPL}^{ca}$). Note that the gas transport resistances are significantly affected by the pressure and temperature in the cell. Therefore, this dependence is taken into account by appropriate scaling. For instance, the resistance to vapor transport in the anode is scaled as follows:

$$\mathcal{R}_v^{an} = \mathcal{R}_{v0}^{an} \frac{p_{an}}{p_{an0}} \left( \frac{T_{CH,avg0} + T_{mb0}}{T_{CH,avg} + T_{mb}} \right)^{1.75} \left( \frac{1 - s_{CL0}}{1 - s_{CL}} \right)^3$$

where the 0 index denotes values that are used in calculating nominal transport resistance ($\mathcal{R}_{v0}^{an}$) and the scaling factors are based on changes in diffusion coefficient with the temperature, pressure, and liquid saturation.

At this point, it is important to point out that some of the physical phenomena were ignored in the reduced-order model. This is done mainly to investigate the robustness of MPC design to modeling mismatch. For instance, the membrane water transport model only includes the effects of electro-osmotic drag and diffusion, while neglecting thermo-osmosis and hydraulic permeation. Nonetheless, such effects are included in the plant model.

Figure 2:
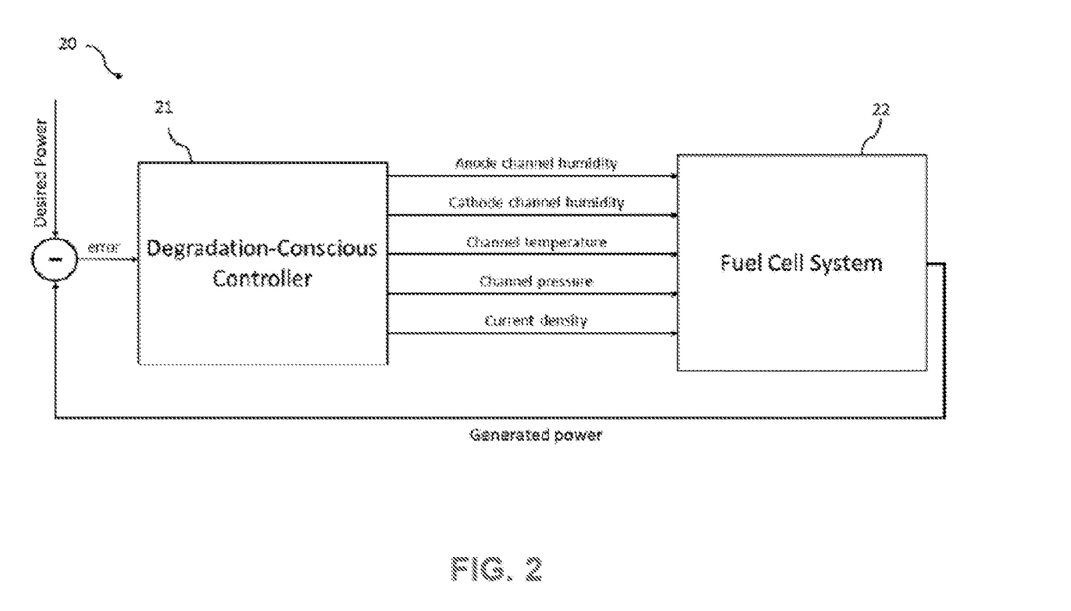
FIG. 2 is a diagram of an example control system for a fuel cell.

FIG. 2 illustrates an example control system 20 for a fuel cell, for example having a polymer electrolyte membrane. The control system 20 is comprised of a controller 21 and one or more fuel cells 22. In an exemplary embodiment, the controller 21 is implemented by a microcontroller. It should be understood that the logic for the controller 21 can be implemented in hardware logic, software logic, or a combination of hardware and software logic. In this regard, controller 21 can be or can include any of a digital signal processor (DSP), microprocessor, microcontroller, or other programmable devices that are programmed with software implementing the above described methods. It should be understood that alternatively the controller is or includes other logic devices, such as a Field Programmable Gate Array (FPGA), a complex programmable logic device (CPLD), or application specific integrated circuit (ASIC). When it is stated that controller 21 performs a function or is configured to perform a function, it should be understood that controller 21 is configured to do so with appropriate logic (such as in software, logic devices, or a combination thereof).

Figure 3:
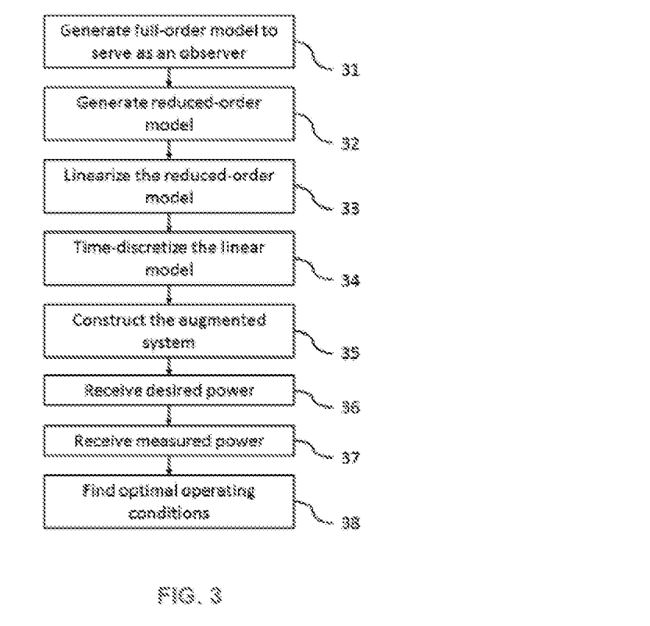
FIG. 3 is a flowchart depicting a method for controlling a fuel cell.

FIG. 3 illustrates an example method for controlling a fuel cell by a controller. As a starting point, a full-order model is generated at 31 to serve as an observer. In an example embodiment, the full-order model has 36 states obtained from spatial discretization of the transport equations described in (1)-(4) in addition to the ionomer relaxation states described in (5). Next, a reduced-order model is generated at 32 for the heat and water transport across the fuel cell. In one embodiment, the reduced-order model has four states corresponding to the water content as described in equations (7)-(9) and the temperature of the membrane as described in equation (10). In this embodiment, vapor concentration and liquid saturation dynamics in the catalyst layer can be derived outside of the controller. In a more robust embodiment, the reduced-order model has eight state. In addition to the four states noted above, the reduced-order model includes states for vapor concentration and liquid saturation dynamics as described in equations (11)-(14). It is noted that water content in the membrane, temperature of the membrane, vapor concentration in a catalyst and liquid saturation in the catalyst are all modeled using only ordinary differential equations.

Next, the control problem is formulated as a state-space representation of a control problem for tracking power output by the fuel cell. Specifically, the control problem is formulated as a linear time varying-model predictive control (LTV-MPC) problem in velocity form. First, the reduced-order model is linearized at each time step about the current state (i.e., current operating condition of the fuel cell) as indicated at 33. It is assumed that full-state feedback from the full-order model is available and the varying parameters in the reduced model are updated based on this information.

In the example embodiment, the linearization is carried out about a non-equilibrium point. Therefore, the linearized dynamics about the point $(x_0, u_0, \Lambda_0)$ have an additional term as follows:

$$\dot{x} = f(x, u, \Lambda) \Rightarrow \dot{\xi} = A\xi + B\eta + f(x_0, u_0, \Lambda_0) \quad (16)$$

$$y = g(x, u, \Lambda) \Rightarrow \Delta_y = C\xi + D\eta \quad (17)$$

$$z = h(x, u, \Lambda) \Rightarrow \Delta_z = C_z\xi + D_z\eta \quad (18)$$

where $\xi \in \mathbb{R}^{8 \times 1}$ and $\eta \in \mathbb{R}^{5 \times 1}$ denote the state and input deviations from the linearization point, respectively.

The linear model is then converted to a discrete form as indicated at 34. In one example, the linear model is converted using zero order hold although other methods are contemplated as well. Using zero order hold, the linearized dynamics in discretized form can be written as:

$$\xi_{k+1} = A_d \xi_k + B_d \eta_k + A^{-1}(\exp(AT_s) - 1) f(x_0, u_0, \Lambda_0) \quad (19)$$

where $T_s$ is the sampling time. Next, an augmented system is constructed at 35 for the rate-based formulation of the power tracking problem. In the example embodiment, the augmented system is formed as:

$$x^{aug} = [\Delta\xi^T, e, \xi^T, \eta^T]^T \quad (20)$$

where the first element is the change in deviation from the linearization state, the second element is the tracking error $e := P_{command} - P_{net}$, the third element is the deviation from the linearization state, and the last element represents the deviation from the input about which the system is linearized. It should be noted that $\xi$ and $\eta$ are included only to enable constraining the states and inputs. These discretized dynamics of the augmented system are governed by:

$$x_{k+1}^{aug} = A^{aug} x_k^{aug} + B^{aug} \Delta\eta_k, \quad (21)$$

$$\Delta z_k = C_z^{aug} x_k^{aug}. \quad (22)$$

The system matrices are as follows:

$$A^{aug} = \begin{bmatrix} A_d & 0 & 0 & 0 \\ C_d & I & 0 & 0 \\ I & 0 & I & 0 \\ 0 & 0 & 0 & I \end{bmatrix},$$

$$B_{aug} = \begin{bmatrix} B_d \\ D_d \\ 0 \\ I \end{bmatrix},$$

$$C_z^{aug} = [0, \ 0, \ C_{z_d}, \ D_{z_d}],$$

where 0 and I denote zero and identity matrices of appropriate sizes, respectively. While propagating the augmented system's dynamics, one should note that the states and inputs are in fact deviations of the state and input trajectories from the linearization point.

Once the linearized augmented dynamics are available, the LTV-MPC problem can be formulated and implemented by a controller 21 interfaced with a fuel cell system 22. During operation, the controller 21 receives a desired power demand for the fuel cell at 36 and a measurement of power output by the fuel cell at 37. The controller determines at 38 the operating conditions of the fuel cell by solving the control problem using the desired power demand and the power measurement for the fuel cell. In the example embodiment, the operating conditions of the fuel cell include anode channel relative humidity, cathode channel relative humidity, channel temperature, channel pressure and current density. These operating conditions in turn serve as input to the fuel cell system.

The stage cost penalizes power tracking error and control elements. In one example, a terminal cost based on the solution to the discrete algebraic Riccati equation (DARE) for the $[\Delta\xi^T, e]^T$ subsystem is used for closed-loop stability. The cost to be minimized is then given as:

$$J_N = \left(x_{N_p}^{aug}\right)^T P_N x_{N_p}^{aug} + \sum_{k=0}^{N_p-1} \left[\Delta n_k^T R \Delta n_k\right] + \epsilon^T \mu \epsilon, \quad (23)$$

where Q and R are appropriate weighting matrices and $$P_N = \begin{bmatrix} P_\infty & 0 \\ 0 & 0 \end{bmatrix},$$

where $P_\infty$ is obtained from the solution of the corresponding DARE as explained above. Additionally, note that the formulation allows for different prediction ($N_p$) and control ($N_u$) horizons to be used. This is done to maintain a low computational cost by using a short control horizon while ensuring stability with a long prediction horizon. Particularly, when the control horizon is shorter than the prediction horizon, the control inputs remain unchanged beyond the control horizon and the model is simulated with a constant control input until the end of the prediction horizon. Therefore, the MPC has to solve for fewer control actions, which simplifies the optimization.

In some embodiments, degradation (state) and actuation (input) constraints are determined. State constraints are specified to maintain the hydration and temperature of the membrane within safe bounds and limit the rate of change of the hydration state. These conditions are shown to affect membrane lifetime through the impact they have on mechanical stress distributions as well as chemical stressors. Furthermore, the liquid saturation in the catalyst layer is constrained to remain below 0.3, since higher saturation values result in significant transport limitations and performance loss. The cell voltage is also constrained between 0.2 and 0.9 Volts. The lower bound is used to avoid starvation issues, while the upper bound is intended to avoid open circuit voltage (OCV) that is a known CCM stressor. In an example embodiment, the state constraints are as follows:

$$7 \leq \lambda_{mb} \leq 14,$$

$$4 \leq \lambda_{an/ca} \leq 14$$

$$|\dot{\lambda}| \leq 0.2 \frac{1}{s},$$

$$60°\,C. \leq T_{mb} \leq 87°\,C.$$

$$s_{CL} \leq 0.3,$$

$$0.2 \leq V_{cell} \leq 0.9$$

The values for the constraints are merely illustrative and non-limiting. Other types of degradation constraints are also contemplated by this disclosure.

The input constraints are determined based on physical properties of the fuel cell systems. The absolute value of the control signals and their respective rates of change are constrained accordingly:

$$20\% \leq RH_{an/ca} \leq 100\% \; 1 \; \text{bar} \leq p_{ch} \leq 3 \; \text{bar}$$

$$0.05 \; A/cm^2 \leq i_{dens} \; 60°\,C. \leq T_{ch} \leq 80°\,C.$$

$$|\Delta RH_{an/ca}| \leq 10\% \times T_s, \; |\Delta p_{ch}| \leq 0.1 \text{bar} \times T_s$$

$$|\Delta T_{ch}| \leq 1°\,C. \times T_s, \; |\Delta i_{dens}| \leq 0.2 \; A/cm^2 \times T_s$$

The constraints on channel pressure and its rate of change come from the compressor capabilities. The lower bound on current density is used to ensure operation away from the OCV. The upper bound, on the other hand, is determined based on the fact that higher current density requires higher flow rates to ensure operation with enough fuel and oxidant. Therefore, the highest current density will also be affected by the compressor capabilities to provide a high enough flow rate. The bound on the current density rate of change is also needed for the same reason. Other input constraints stem from physical limits on the system. Finally, the tracking error is constrained to remain below 0.1 W/cm². The idea with this approach is to penalize the tracking error with a relatively small weight in the original cost function, while a large weight is used to penalize errors outside these bounds. This is intended to give the controller tracking capabilities within these bounds while allowing for errors to occur if other constraints are being violated.

In the example embodiment, the state constraints are treated as soft constraints (with slack variables), while the input constraints are treated as hard constraints (the inputs are capped between their corresponding bounds). This also ensures that a feasible point exists for the optimization problem. Since the states of the system have largely different orders of magnitude (ranging from $10^{-6}$ for concentration to $10^2$ for temperature), different slack values need to be used for different states. To formulate the optimization problem, the batch approach is used, where the linearized dynamics are utilized to describe all future states in terms of the current states and future inputs. Following this approach and considering the constraints described above, leads to the optimization problem below, which is a quadratic program (QP):

$$\underset{U}{\text{minimize}} \; J_N = U^T H U + 2q^T U \quad (24)$$

subject to $$GU \leq W + Tx_0^{aug}$$

where U is the input vector over the prediction horizon augmented with slack variables. The approach to form the cost and constraint matrices in the above QP can be found in A. Bemporad et al "The explicit linear quadratic regulator for constrained systems", Automatica Vol. 38, No. 1 (2002), and is not explained for brevity.

In the example embodiment, the weighting matrix for the control increments is chosen to be identity ($R=I_{5\times5}$). The power tracking error is penalized with a weight of Q=10. Same weighting values are used to solve the DARE and generate the terminal cost penalty $P_\infty$.

Given the stiffness of the system's model and the fact that dynamics happen on various time scales, a relatively small sampling time is required to capture the fast system dynamics and ensure the system remains controllable. Accordingly, a sampling time of $T_s=0.1$ s was found to be adequate for the example embodiment considered here.

As for the prediction horizon, typically longer horizons improve the MPC performance at the cost of longer computation times. It is also important to note that a relatively long prediction horizon is needed here to effectively control the membrane hydration state, as it is governed by slow dynamics compared to other system states. However, longer prediction horizons are not always helpful in this application. There are several reasons that contributed to this observation. First the reduced model is much simpler than the plant model and has to be updated after a short period of time based on the full-state feedback from the full-order model. Furthermore, the MPC uses a linearized version of this reduced model, whose deviations from the original nonlinear model become more significant over time. The fact that linearization is done about a non-equilibrium point further contributes to this discrepancy. Through numerical simulations, it was found that a range of $N_p=20$ to $N_p=60$ results in the best performance for the example embodiment considered here. In particular, a prediction horizon of $N_p=30$ was found to strike a good balance between performance and computation load and is used for the example embodiment considered in this disclosure. Moreover, $N_u=N_p$ in this example embodiment. With this prediction horizon, the optimization vector has 173 elements, i.e., $U \in \mathbb{R}^{173 \times 1}$. Out of these 173 values, 150 correspond to control moves, while the rest are the slack variables used to implement the constraints.

The number of control moves to execute is another important factor. Each time the QP is solved, a control law is generated over the prediction horizon (in this example embodiment $N_p=30$). However, MPC typically executes the first control move and recalculates a new control move in the next sampling time. This requires the model to be updated and the QP to be solved at every time step. To reduce the computational load, we choose to use the first five control moves that the QP generates in this example embodiment. In other words, we only update the model and solve the resulting QP every five time steps. This significantly reduces the computational time. This goal cannot be achieved by increasing the sampling time, $T_s$, as a small sampling time is required to properly capture the system dynamics in discrete form.

In one example, the resulting QP is solved with the Operator Splitting Quadratic Program (OSQP) solver described by Stellato et al in "OSQP: An Operator Splitting Solver for Quadratic Programs", Mathematical Programming Computation (2020). A tolerance of $10^{-3}$ and a maximum number of iterations of 500 are used. Other types of solvers also fall within the scope of this disclosure.

For proof of concept, the framework is implemented using custom-written MATLAB code and run on a laptop with a 2.6 GHz processor and 20 GB of RAM. The simulation results presented below are obtained in 572 seconds. However, most of this time is spent on simulating the plant model and only 41 seconds were needed to compute the control law over the entire simulation time. Particularly, the maximum time to solve the QP was 0.2 seconds. Noting that the QP has to be solved every 0.5 seconds, an embedded code implementation is expected to achieve real-time performance even with the plant model's simulation time included.

Figure 4:
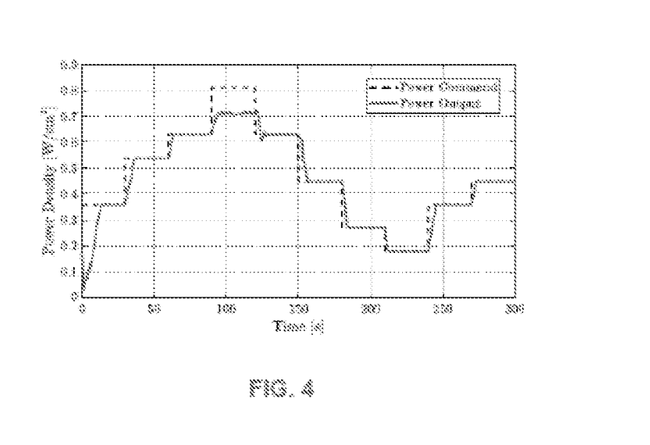
FIG. 4 is a graph showing time traces of the fuel cell power output (solid line) and reference value (dashed line).
Figure 5A:
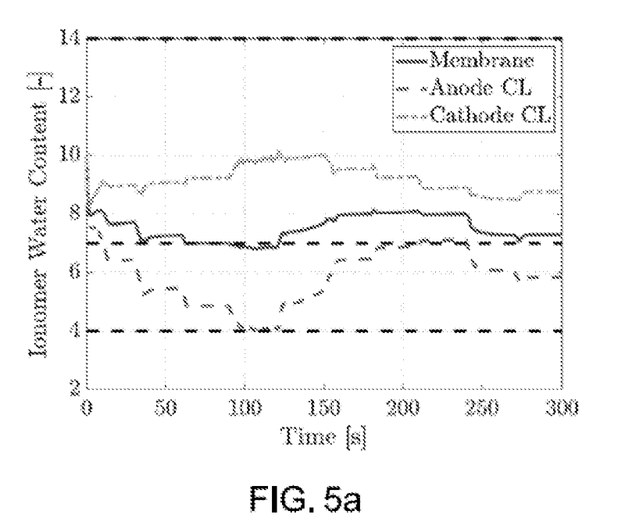
FIGS. 5A-5D are graphs showing time traces of fuel cell states: (a) the ionomer water content, (b) the membrane temperature, (c) the water vapor concentration, and (d) the liquid saturation in the catalyst layers.
Figure 5B:
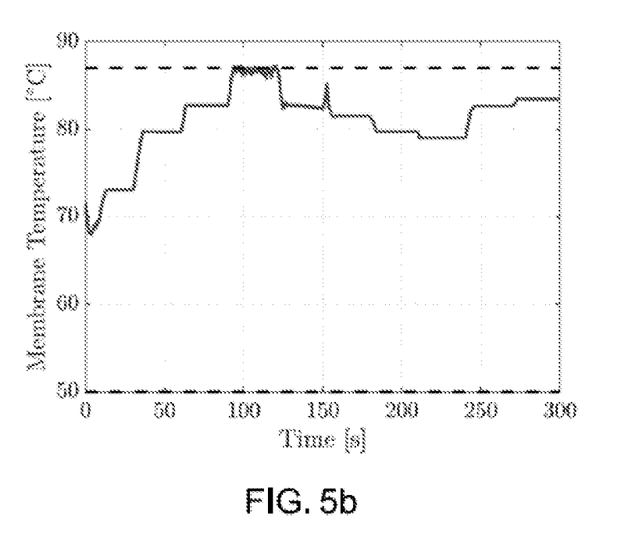
Figure 5C:
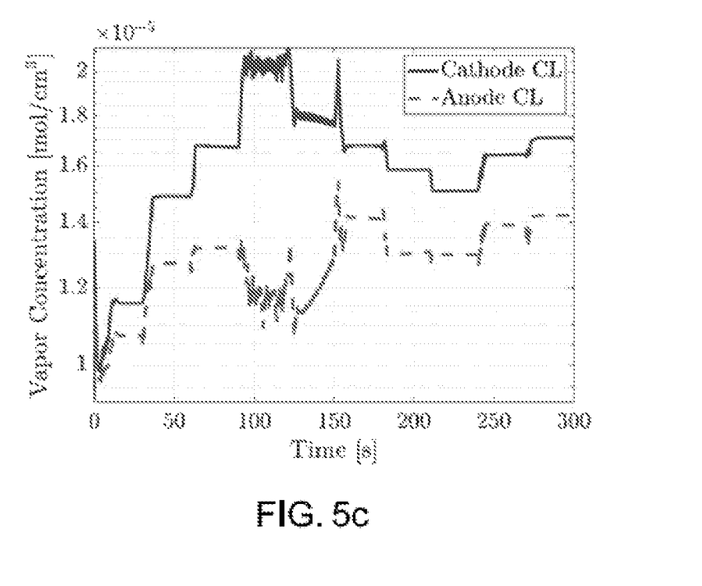
Figure 5D:
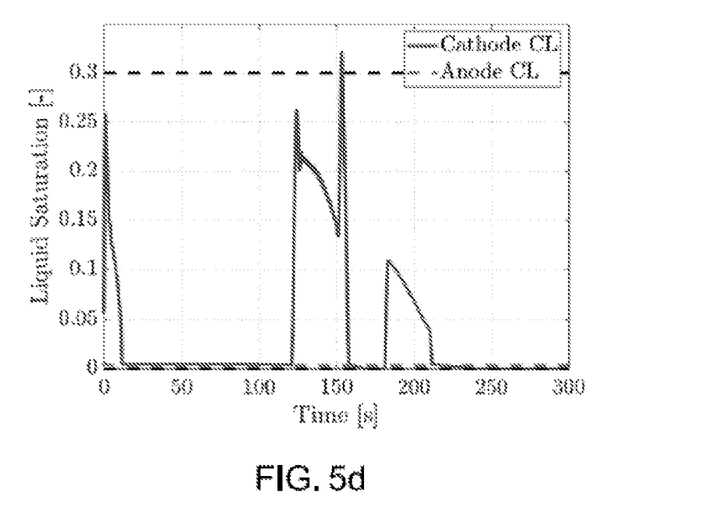
Figure 6A:
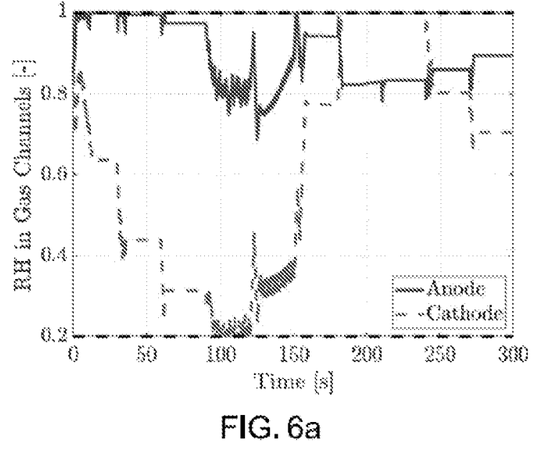
FIGS. 6A-6D are graphs showing time traces of fuel cell inputs: (a) the relative humidity in the channels, (b) the gas pressure in the channels, (c) current density and output voltage, (d) channel temperature. Constraints are shown as black dashed horizontal lines.
Figure 6B:
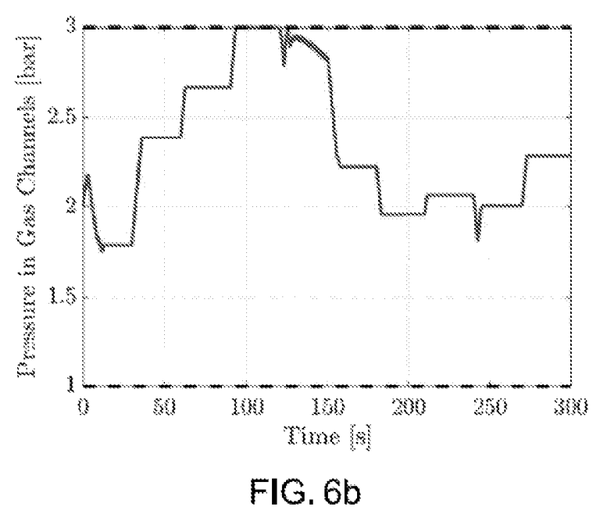
Figure 6C:
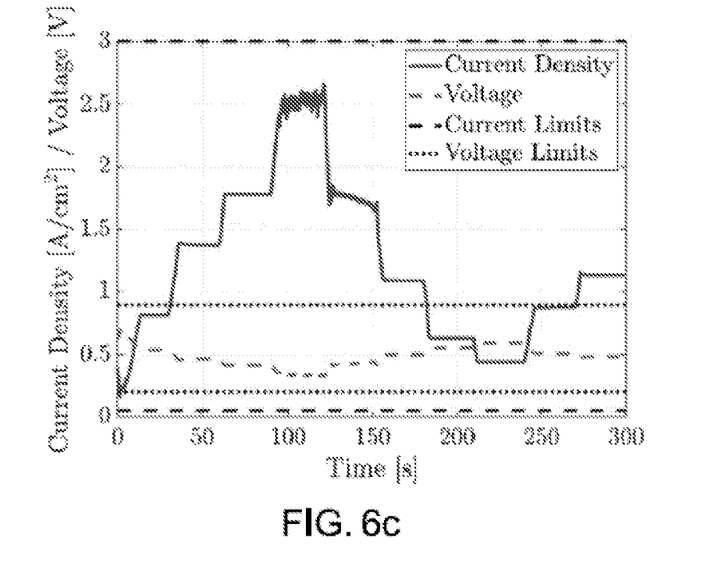
Figure 6D:
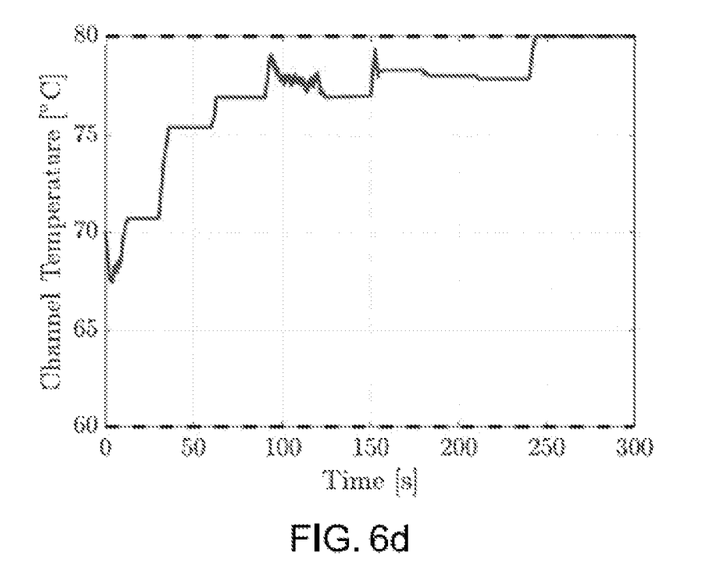

FIG. 4 depicts a power profile used to study the effectiveness of the LTV-MPC algorithm in meeting the power demand while satisfying the system and degradation constraints. The fuel cell reference power is held constant for 30 seconds before a step change is applied to command the power to a different reference level. Both step-ups and step-downs are included in the command trajectory to investigate the controller's utility under varying conditions. As seen in the figure, the algorithm is able to track the reference signal in spite of the modeling mismatch between the MPC model and the plant model. Only the highest power demand is not met, which is due to the degradation constraints and the actuation limits.

FIGS. 5A-5D show the time traces of the system states for ionomer water content, membrane temperature, water vapor concentration and reactant concentration in the catalyst layers, respectively. These are the states that are included in the MPC model, but the traces show the states of the plant model. The MPC can successfully impose the constraints, with only minor constraint violation, which is expected given the mismatch between the plant and MPC models. Also note that all constraint violations happen at the time that the controller is attempting to meet a very high power demand. Therefore, the system is operating at its limits. Given that the constraints were chosen to be conservative, such slight violations are acceptable. The impact of these violations can be reduced in applications by choosing even more conservative constraints or increasing the slack penalty for the most critical states.

Finally, FIGS. 6A-6D show the control inputs generated by the LTV-MPC algorithm. The control constraints are imposed as hard constraints and no violation is allowed, which can be seen in the figure. It is observed that both the pressure and current density are increased to meet higher power demands. Furthermore, it is interesting to note that MPC reduces cathode hydration during high power demands, since the electrochemically produced water is sufficient to hydrate the membrane and additional water can result in catalyst layer flooding and loss of performance.

The significance of these results lies in the ability of the LTV-MPC framework to satisfy the degradation constraints, which is demonstrated here. A simple linear quadratic regulator (LQR) without these degradation constraints may provide improved tracking response at the expense of violating such constraints. In fact, such a controller was tested with the same power profile. The results indicated faster power tracking capability of the LQR controller at the cost of a much drier membrane (the membrane hydration state becomes as low as $\lambda=4$) and faster changes in the membrane hydration. Such dry conditions and rapid changes in the membrane hydration state can have profound consequences for the membrane's mechanical durability, thereby limiting its useful lifetime. Therefore, the LTV-MPC framework allows the fuel cell system to meet the power demand while satisfying these degradation constraints and provides an avenue for enhancing the durability of existing fuel cell materials through intelligent control design.

In another aspect of this disclosure, the technique may account for simplified models of the auxiliary components of the fuel cell system, thereby allowing for more accurate description of their power consumption. For example, a fuel cell system controller should consider capabilities and limitations of the reactant supply subsystem and the cooling subsystem. Accounting for these subsystems in the control formulation ensures that the safe and optimal conditions required by the fuel cell stack can indeed be provided by other system components. Therefore, these subsystems are also modeled for control design purposes as further described below.

Figure 7:
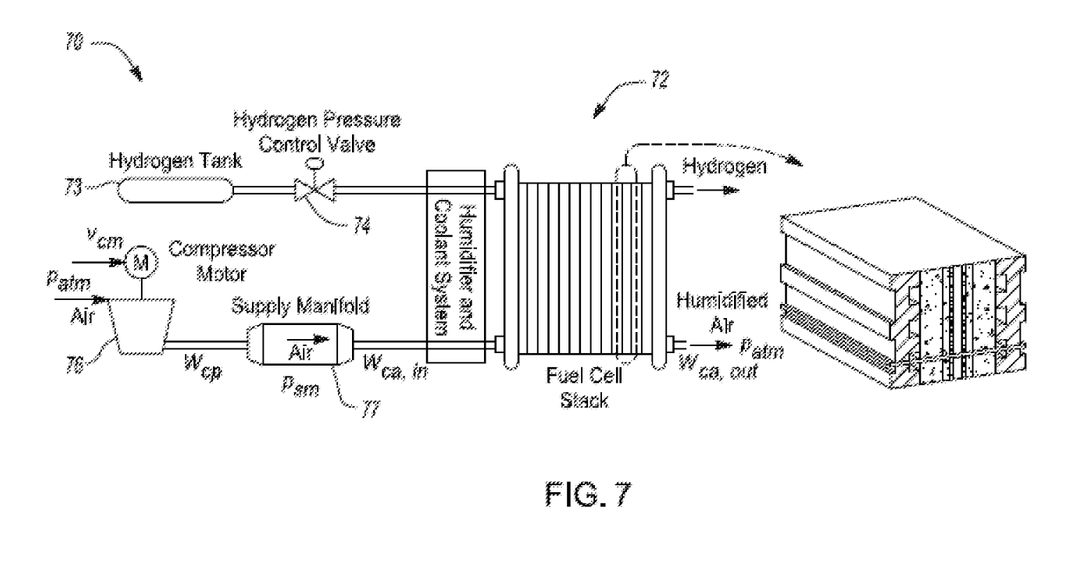
FIG. 7 is a diagram of an example fuel cell system.

FIG. 7 depicts an example fuel cell system 70. The fuel cell system is comprised primarily of one or more fuel cells forming a fuel cell stack 72, where each fuel cell includes a polymer electrolyte membrane. A high pressure tank 73 is fluidly coupled via a control valve 74 to the fuel cell stack 72. Hydrogen is supplied from the high pressure tank, such that the flow rate is controlled by the control valve 74. While, hydrogen recirculation is not considered in this example embodiment, it falls within the scope of this disclosure. An air compressor 76 is also fluidly coupled via a supply manifold 77 to the fuel cell stack 72.

During operation, the high pressure storage of the hydrogen leads to negligible dynamics for the anode volume, where the pressure can be rapidly adjusted. Therefore, one can neglect the fast dynamics for hydrogen supply and focus exclusively on the air supply dynamics, where the rotational dynamics of the compressor and the filling dynamics of the cathode volume need to be captured by the model. Proper modeling of these dynamics allows control design that ensures safe (i.e., no compressor surge or choke) and sufficient (i.e., no starvation) delivery of the oxygen required for the electrochemical reactions. To this end, the air supply subsystem model is adopted from the literature, where the dynamic states are the compressor speed ($\omega_{cp}$), the supply manifold pressure ($p_{sm}$), and the cathode pressure ($p_{ca}$). The corresponding dynamics are given by:

$$\frac{d\omega_{cp}}{dt} = \frac{1}{J_{cp}}(\tau_{cm} - \tau_{cp}), \quad (25)$$

$$\frac{dp_{sm}}{dt} = \frac{RT_{cp}}{M_{a,atm}V_{sm}}(W_{cp} - W_{ca,in}), \quad (26)$$

$$\frac{dp_{ca}}{dt} = \frac{RT_{CH,avg}}{V_{ca}}\left(\frac{W_{O_2,in} - W_{O_2,out} - W_{O_2,GDL}}{M_{O_2}} + \frac{W_{N_2,in} - W_{N_2,out}}{M_{N_2}} + \frac{W_{v,in} - W_{v,out} - W_{v,GDL}}{M_{H_2O}}\right), \quad (27)$$

where $\tau_{cm}$ and $\tau_{cp}$ are the motor and load torque of the compressor, respectively, $J_{cp}$ is the compressor inertia, R is the universal gas constant, $T_{cp}$ is the compressor flow temperature, $M_{a,atm}$ is the molar weight of atmospheric air, $V_{sm}$ is the supply manifold volume, $T_{CH,avg}$ is the average temperature in the flow channel, $V_{ca}$ is the cathode volume, $W_{cp}$ is the mass flow rate of air out of the compressor, $W_{ca,in}$ is the air mass flow rate into the cathode volume, $W_{i,in}$ and $W_{i,out}$ denote the mass flow rate of species i into and out of the cathode, respectively, and $W_{i,GDL}$ is the mass flow rate of species i into the GDL. The static relations for the terms in the above equations are provided in Table 1 below.

TABLE 1

Static relations for air supply subsystem

| Variable | Equation |
|---|---|
| $\tau_{cm}$ | $\eta_{cm}\dfrac{k_t}{R_{cm}}(\upsilon_{cm}-k_\upsilon\omega_{cp})$ |
| $\tau_{cp}$ | $\dfrac{C_p T_{atm}}{\eta_{cp}\omega_{cp}}\left[\left(\dfrac{p_{am}}{p_{atm}}\right)^{\frac{\gamma-1}{\gamma}}-1\right]W_{cp}$ |
| $T_{cp}$ | $T_{atm}+\dfrac{T_{atm}}{\eta_{cp}}\left[\left(\dfrac{p_{am}}{p_{atm}}\right)^{\frac{\gamma-1}{\gamma}}-1\right]$ |
| $W_{cp}$ | $\Phi\rho_a\dfrac{\pi}{4}d_c^2 U_c p_{cp,in}\sqrt{\dfrac{288}{T_{cp,in}}}$ |
| $W_{ca,in}$ | $k_{ca,in}(p_{sm}-p_{ca})$ |
| $W_{O_2,in}$ | $\dfrac{x_{O_2}}{1+\omega_{ca,in}}W_{ca,in}$ |
| $W_{N_2,in}$ | $\dfrac{1-x_{O_2}}{1+\omega_{ca,in}}W_{ca,in}$ |
| $W_{v,in}$ | $\dfrac{\omega_{ca,in}}{1+\omega_{ca,in}}W_{ca,in}$ |
| $W_{ca,out}$ | $\dfrac{C_D A_T p_{ca}}{\sqrt{RT_{CH,out}}}C_W$ |
| | $C_W=\left(\dfrac{p_{atm}}{p_{ca}}\right)^{\frac{1}{\gamma}}\sqrt{\dfrac{2\gamma}{1-\gamma}\left(1-\left(\dfrac{p_{atm}}{p_{ca}}\right)^{\frac{\gamma-1}{\gamma}}\right)}$ for $\dfrac{p_{atm}}{p_{ca}}>\left(\dfrac{2}{\gamma+1}\right)^{\frac{\gamma}{\gamma-1}}$ |
| | $C_W=\sqrt{\gamma}\left(\dfrac{2}{\gamma+1}\right)^{\frac{\gamma+1}{2(\gamma-1)}}$ for $\dfrac{p_{atm}}{p_{cm}}\leq\left(\dfrac{2}{\gamma+1}\right)^{\frac{\gamma}{\gamma-1}}$ |
| $W_{O_2,out}$ | $\dfrac{M_{O_2} p_{O_2}}{M_{O_2}p_{O_2}+M_{N_2}p_{N_2}+M_{H_2O}p_v}W_{ca,out}$ |
| $W_{N_2,out}$ | $\dfrac{M_{N_2}p_{N_2}}{M_{O_2}p_{O_2}+M_{N_2}p_{N_2}+M_{H_2O}p_v}W_{ca,out}$ |
| $W_{v,out}$ | $\dfrac{M_{H_2O}p_v}{M_{O_2}p_{O_2}+M_{N_2}p_{N_2}+M_{H_2O}p_v}W_{ca,out}$ |
| $W_{O_2,GDL}$ | $M_{O_2}n_{cell}A_{fc}\dfrac{i_{dens}}{4F}$ |
| $W_{v,GDL}$ | $M_{H_2O}n_{cell}A_{fc}\dfrac{c_{v,CH}-c_{v,CDL3}}{\mathcal{R}_v}$ |

Following the above calculations, the oxygen stoichiometry is given by:

$$St_{O_2}=\frac{W_{O_2 in}}{W_{O_2 GDL}}. \qquad (28)$$

Moreover, the power consumed by the compressor motor is determined as follows:

$$P_{cm}=\frac{\upsilon_{cm}}{R_{cm}}(\upsilon_{cm}-k_\upsilon\omega_{cp}), \qquad (29)$$

where $v_{cm}$ is the compressor motor voltage, which is an input to the model, and $R_{cm}$ and $k_v$ are compressor motor parameters.

With regards to the coolant circulation, the relation between the coolant flow rate and the corresponding change in its temperature is given by:

$$\begin{aligned}Q_{cool}&=\dot{m}_{cool}C_{p,cool}\Delta T_{cool} \\ &=h_{conv}A_{cool}[T_{GDL}-T_{CH,avg}] \\ &=h_{conv}A_{cool}\left[T_{GDL}-\left(T_{cool,in}+\frac{1}{2}\Delta T_{cool}\right)\right],\end{aligned} \qquad (30)$$

where $\dot{m}_{cool}$, $C_{p,cool}$, $T_{cool,in}$, and $\Delta_{T_{cool,in}}$ denote the coolant flow rate, its specific heat capacity, its inlet temperature, and its temperature change, respectively, $h_{conv}$ is the convective heat transfer coefficient, $A_{cool}$ is the area available for cooling, and $T_{GDL}$ is the temperature in the GDL3 control volume. The model inputs for the coolant circulations subsystem include the coolant inlet temperature ($T_{cool,in}$) and its flow rate ($\dot{m}_{cool}$). While the heater and radiator are not explicitly modeled for simplicity, the thermal dynamics of the coolant are accounted for in the control formulation described below.

Lastly, it is assumed that the compressor motor and all auxiliary equipment are powered by the fuel cell system. Therefore, the net power output of the system is given by:

$$P_{net}=P_{fc}-P_{cm}-P_{aux}, \qquad (31)$$

where $P_{aux}$ is the total power consumed by all other auxiliary equipment, such as the cooling system, the humidifier, and various valves. Here, one can assume that the auxiliary power consumption scales linearly with the current density and the coolant flow rate:

$$P_{aux}=0.5+\frac{i_{dens}}{i_{deas,max}}+\frac{\dot{m}_{cool}}{\dot{m}_{cool,max}}[kW], \qquad (32)$$

where the maximum power consumption by all auxiliary equipment is assumed to be 2.5 kW. In the control formulation, one can also maximize the overall system efficiency. To this end, minimize the fraction of net power consumed by the auxiliary components, which is given by:

$$P_{frac}=\frac{P_{cm}+P_{aux}}{P_{net}}. \qquad (33)$$

This completes the plant model formulation for reactant and coolant supply subsystems.

In an example embodiment, the plant model has a total of 40 dynamic states:

$$x=[c_v^T, p_1^T, T^T, \lambda^T, \theta_{PtO}, \omega_{cp}, p_{sm}, p_{ca}]^T, \quad (34)$$

where bold symbols denote vector-valued variables whose dynamics are governed by Equation (1)-(4). The six model inputs are given by:

$$u=[RH_{an}, RH_{ca}, T_{cool,in}, v_{cm}, i_{dens}, \dot{m}_{cool}]^T, \quad (35)$$

where $RH_{an}$ and $RH_{ca}$ denote the relative humidity in the channels, which provide the required boundary conditions for Equation (1) and also impact the membrane hydration state. Finally, the two outputs of the plant model are:

$$y=[P_{net}, P_{frac}]^T. \quad (36)$$

The large-scale plant model described above is not amenable to online computations required for optimization-based control. Therefore, a reduced-order model of the fuel cell described by Equation (7)-(14) is used for control design purposes. The plant model for the reactant and coolant supply subsystems is a lumped-parameter model with three dynamic states and requires no further simplification.

In addition to the states described by Equation (7)-(14), the state vector for the control-oriented model of the entire system includes the compressor and manifold filling dynamic states and is given by:

$$x=[\lambda_{CL}^{an}, \lambda_{CL}^{ca}, \lambda_{mb}, T_{mb}, c_{v,CL}^{an}, c_{v,CL}^{ca}, s_{CL}^{an}, s_{CL}^{ca}, \omega_{cp}, p_{sm}, p_{ca}]^T. \quad (37)$$

The model inputs and outputs are identical to the full-order plant model shown in Equations (35) and (36), respectively. In addition to the outputs, the following vector of constrained variables is predicted by the model:

$$z=[V_{cell}, z_{surge}, z_{choke}, St_{O_2}, \Delta T_{cool}]^T, \quad (38)$$

where $V_{cell}$ is the cell voltage, $\Delta T_{cool}$ denotes the change in the coolant temperature, and $z_{surge}$ and $z_{choke}$ are the linear approximations for compressor surge and choke boundaries, respectively, given by:

$$z_{surge} = \frac{p_{sm}}{p_{atm}} - 50\, W_{cp}, \quad (39)$$

$$z_{choke} = \frac{p_{sm}}{p_{atm}} - 15.27\, W_{cp}. \quad (40)$$

The variables contained in z are used to impose safety constraints for the system operation.

With the reduced-order model formulated, the rest of the control problem formulation follows the steps previously described in Equation (16)-(24). In this formulation, one can assume that the command, i.e., the requested power, remains constant (at its current value) throughout the prediction horizon of MPC. However, this is rarely the case in applications, as the command typically varies with time even within the prediction horizon. While the above approach can successfully track slowly varying commands, it may fail when the command changes rapidly. For improved tracking under such circumstances, a command preview can be used, where one can assume that the time-varying command is known over a certain time horizon. The augmented system dynamics can be further modified to enable this command preview.

To ensure the actuator limits are satisfied in operation, the following input constraints are imposed in this example embodiment:

$$30\% \le RH_{an} \le 100\%, \quad 30\% \le RH_{ca} \le 100\%,$$

$$65°\,\text{C.} \le T_{cool,in} \le 80°\,\text{C.}, \quad 60\,\text{V} \le v_{cm} \le 240\,\text{V},$$

$$0.05\,\text{A}\cdot\text{cm}^{-2} \le i_{dens} \le 1.75\,\text{A}\cdot\text{cm}^{-2}, \quad 0.1\,\text{kg}\cdot\text{s}^{-1} \le \dot{m}_{cool} \le 4\,\text{kg}\cdot\text{s}^{-1}.$$

The above constraints are motivated by the fuel cell system capabilities. In case of the current density, note that the lower bound is used to ensure operation away from the open-circuit voltage (OCV), which is a known catalyst and membrane stressor. The current density upper bound is chosen based on the compressor's capability to maintain a safe oxygen stoichiometry.

The rates of change of the inputs are also constrained. This is done to account for the actuator dynamics that are not explicitly modeled. For instance, the coolant temperature cannot change instantaneously due to the dynamics associated with the heater and radiator. Therefore, such dynamic limits are taken into account as follows:

$$|\Delta RH_{an}| \le 10\%\,\text{s}^{-1} \times T_s, \quad |\Delta RH_{ca}| \le 10\%\,\text{s}^{-1} \times T_s,$$

$$|\Delta T_{cool,in}| \le 0.1°\,\text{C.}\cdot\text{s}^{-1} \times T_s, \quad |\Delta v_{cm}| \le 10\,\text{V}\cdot\text{s}^{-1} \times T_s,$$

$$|\Delta i_{dens}| \le 0.5\,\text{A}\cdot\text{cm}^{-2}\cdot\text{s}^{-1} \times T_s, \quad |\Delta \dot{m}_{cool}| \le 0.2\,\text{kg}\cdot\text{s}^{-2} \times T_s.$$

Note that the above constraints on the actuators are all enforced as hard constraints, i.e., no constraint violation is allowed.

Safety and degradation constraints that are imposed on the dynamic states or their rates of change, as well as the auxiliary z variables are considered. In particular, to ensure membrane durability, one can enforce:

$$5 \le \lambda_{CL} \le 14, \quad 7 \le \lambda_{mb} \le 14,$$

$$|\Delta \lambda_{mb}| \le 1s^{-1} \times T_s, \quad T_{mb} \le 87°\,\text{C.}$$

These constraints are imposed to avoid subjecting the membrane to significant hydration and dehydration cycles and inhibit its excessive heating. Furthermore, the rate of change of the membrane hydration is constrained, since it controls the mechanical stresses in the membrane that can lead to crack initiation or propagation.

The safe operation of the compressor is guaranteed by the following constraints:

$$40\,\text{kRPM} \le \omega_{cp} \le 100\,\text{kRPM},$$

$$z_{surge} \le -0.1 \quad 0.6 \le z_{choke},$$

$$1.5\,\text{bar} \le p_{sm} \le 3.5\,\text{bar}.$$

Moreover, to ensure robust and sufficient supply of reactants to the active sites in the CLs, the following limits are imposed:

$$1.5 \leq St_{O_2} \quad 1.2 \text{ bar} \leq p_{ca} \leq 3.0 \text{ bar},$$

$$s_{CL} \leq 0.3, \quad 0.2 \text{ V} \leq E_{cell} \leq 0.9 \text{ V},$$

where the constraints on $St_{O_2}$ and $p_{ca}$ are used to ensure sufficient delivery of oxygen to the cathode channels at a high enough pressure and the constraint on $s_{CL}$ and the lower bound for the cell voltage guarantee sufficient reactant concentration at the Pt surfaces. The upper bound for cell voltage is essentially clipping the cell voltage for improved catalyst durability. Note that the hydrogen stoichiometry is assumed to be constant at 1.5 in this example embodiment.

Lastly, to avoid excessive heating of the cell, the change in the coolant temperature is limited:

$$\Delta T_{cool} \leq 10° \text{ C}.$$

The safety and degradation constraints are all imposed as soft constraints with slack variables to ensure feasibility of the problem.

Overall, these constraints ensure safe and reliable operation of the entire fuel cell system and are used to extend the useful lifetime of the fuel cell stack.

The weighting matrices for this example embodiment are chosen as follows:

$$Q_e=50, \quad Q_p=10, \quad Q_u=\text{diag}(0,2,0,0,5,0),$$

$$R=\text{diag}(5,5,5,0.05,1,2.5).$$

These weights are chosen to penalize the tracking error ($Q_e=50$) and ensure offset-free tracking of the power demand when possible, while minimizing the power consumption by auxiliary equipment ($Q_P=10$). Moreover, two of the system inputs are penalized (nonzero elements in $Q_u$). Specifically, since hydrogen consumption is directly related to the stack current (assuming constant hydrogen stoichiometry), the current density is penalized with a weight of 5 to minimize the fuel consumption. In addition, a small penalty (weight of 2) is imposed on the cathode channel RH to minimize the humidification requirements and explore opportunities for downsizing the humidifier. Only the cathode RH is penalized, since humidifying the cathode requires a larger humidifier due to higher air mass flow rates compared to the hydrogen flow rates in the anode. The rates of change of the inputs are also penalized (R), where the weights are chosen based on the scales of the inputs. Lastly, to obtain the terminal penalty, the DARE is solved with $\mathbb{R}_\infty = \mathbb{R}$ and:

$$Q_\infty = \text{diag}(0, Q_e, Q_p).$$

In this example, the entire degradation-conscious control framework is implemented in MATLAB. Particularly, the plant model is integrated with the stiff solver ode23t. The reduced-order dynamics are analytically linearized. The QP matrices are formulated using in-house MATLAB code and the optimization is solved with the Operator Splitting Quadratic Program (OSQP) solver described by Stellato et al in "OSQP: An Operator Splitting Solver for Quadratic Programs", Mathematical Programming Computation (2020). A tolerance of $10^{-5}$ and a maximum number of iterations of 1000 are used. When a number of constraints become active, this iteration limit is reached. Nevertheless, the numerical experiments show negligible improvements performance or constraint satisfaction when the algorithm is allowed to iterate longer to ensure convergence. Therefore, this maximum iteration limit was chosen to balance the algorithm convergence with its computational requirements. The simulations are run on a computer with a 2.5 GHz processor and 16 GB of RAM.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling a fuel cell having a polymer electrolyte membrane, comprising:
    generating a reduced-order model for heat and water transport across the fuel cell, where water content in the membrane is modeled using only ordinary differential equations and temperature of the membrane is modeled using only ordinary differential equations;
    linearizing the reduced-order model at each time step about a current operating condition of the fuel cell to form a linear model;
    formulating a state-space representation of a control problem for tracking power output by the fuel cell from the linear model;
    receiving, by a controller, a desired power demand for the fuel cell;
    receiving, by the controller, a measurement of power output by the fuel cell;
    determining, by the controller, the operating conditions of the fuel cell by solving the control problem using the desired power demand and the power measurement for the fuel cell; and
    controlling, by the controller, at least one of flow rate of hydrogen into the fuel cell or delivery of air into the fuel cell based on the determined operating conditions.

2. The method of claim 1 wherein generating a reduced-order model further includes
    modeling vapor concentration in a catalyst using only ordinary differential equations; and
    modeling liquid saturation in the catalyst using only ordinary differential equations;
    such that the reduced-order model includes vapor concentration in the catalyst and liquid saturation in the catalyst.

3. The method of claim 1 wherein the operating conditions of the fuel cell determined by the controller include anode channel relative humidity, cathode channel relative humidity, channel temperature, channel pressure and current density.

4. The method of claim 1 wherein formulating the state-space representation includes converting the continuous-time linear model to a time-discretized form using zero order hold.

5. The method of claim 1 wherein formulating the state-space representation includes representing states in the state-space representation as deviations of the state from the current operating condition and representing inputs in the state-space representation as trajectories from the current operating condition.

6. The method of claim 1 further comprises formulating the state-space representation as a linear quadratic-model predictive control problem in velocity form.

7. The method of claim 1 further comprises solving the control problem using a solver for quadratic programs.

8. The method of claim 1 further comprises formulating the control problem with constraints, where states in the state-space representation are soft-constrained with slack variables and inputs in the state-space representation are hard-constrained with strict bounds.

9. The method of claim 8 wherein the states in the state-space representation are constrained to maintain hydration and temperature of the membrane within desired bounds.

10. The method of claim 8 wherein the inputs in the state-space representation are constrained by physical properties of the fuel cell.

11. A method for controlling a fuel cell system with an air compressor, a cooling subsystem and at least one fuel cell having a polymer electrolyte membrane, wherein the air compressor delivers oxygen to cathode of the at least one fuel cell, comprising:
    generating a reduced-order model for the fuel cell system, where the reduced-order model models heat and water transport across the at least one fuel cell and models operating parameters for an air compressor and cooling subsystem of the fuel cell system, where water content in the membrane is modeled using only ordinary differential equations and temperature of the membrane is modeled using only ordinary differential equations;
    linearizing the reduced-order model at each time step about a current operating condition of the fuel cell system to form a linear model;
    formulating a state-space representation of a control problem for tracking power output by the fuel cell system from the linear model;
    receiving, by a controller, a desired power demand for the fuel cell system;
    receiving, by the controller, a measurement of power output by the fuel cell system;
    determining, by the controller, the operating conditions of the fuel cell system by solving the control problem using the desired power demand and the power measurement for the fuel cell system; and
    controlling, by the controller, at least one of flow rate of hydrogen into the at least one fuel cell or delivery of air into the at least one fuel cell based on the determined operating conditions.

12. The method of claim 11 wherein generating a reduced-order model further includes
    modeling speed of the air compressor, where the speed of the air compressor is modeled using only ordinary differential equations;
    modeling pressure in supply manifold coupled to the air compressor, where the pressure in the supply manifold is modeled using only ordinary differential equations; and
    modeling pressure in cathode of the at least one fuel cell, where the pressure in the cathode of the at least one field cell is modeled using only ordinary differential equations.

13. The method of claim 11 wherein generating a reduced-order model further includes modeling heat exchange between coolant of the cooling subsystem and the at least one fuel cell.

14. The method of claim 11 wherein generating a reduced-order model further includes
    modeling vapor concentration in a catalyst using only ordinary differential equations; and modeling liquid saturation in the catalyst using only ordinary differential equations;

such that the reduced-order model includes vapor concentration in the catalyst and liquid saturation in the catalyst.

15. The method of claim 11 further comprises generating a full-order model for the fuel cell system, where diffusive mass transport and conductive heat transport are modeled using partial differential equations;

using the full-order model to obtain estimates of the fuel cell states, where measuring the internal states is not feasible.

16. The method of claim 11 wherein the operating conditions of the fuel cell system determined by the controller include anode channel relative humidity, cathode channel relative humidity, current density, coolant temperature in the cooling subsystem, coolant flow rate in the cooing subsystem and voltage applied to the air compressor.

17. The method of claim 11 wherein formulating the state-space representation includes converting the continuous-time linear model to a time-discretized form using zero order hold.

18. The method of claim 11 wherein formulating the state-space representation includes representing states in the state-space representation as deviations of the state from the current operating condition and representing inputs in the state-space representation as trajectories from the current operating condition.

19. The method of claim 11 further comprises formulating the state-space representation as a linear quadratic-model predictive control problem in velocity form.

20. The method of claim 11 further comprises solving the control problem using a solver for quadratic programs.

21. The method of claim 11 further comprises formulating the control problem with constraints, where states in the state-space representation are soft-constrained with slack variables and inputs in the state-space representation are hard-constrained with strict bounds.

22. The method of claim 21 wherein the states in the state-space representation are constrained to maintain hydration and temperature of the membrane within desired bounds.

23. The method of claim 21 wherein the inputs in the state-space representation are constrained by physical properties of the fuel cell.

* * * * *